INVENTOR.
Jean Pierre Magnin
BY Richard E. Bee
ATTORNEY

INVENTOR.
Jean Pierre Magnin
BY Richard E. Bee
ATTORNEY

INVENTOR.
Jean Pierre Magnin
BY
Richard E. Bee
ATTORNEY

May 3, 1966 J. P. MAGNIN 3,249,878

SYNCHRONOUS SIGNAL GENERATORS

Filed Jan. 16, 1962 7 Sheets-Sheet 4

INVENTOR.
Jean Pierre Magnin
BY Richard E. Bee
ATTORNEY

INVENTOR.
Jean Pierre Magnin
BY Richard E. Bee
ATTORNEY

INVENTOR.
Jean Pierre Magnin
BY
Richard E. Bee
ATTORNEY

INVENTOR.
Jean Pierre Magnin
BY
Richard E. Bee
ATTORNEY

United States Patent Office 3,249,878
Patented May 3, 1966

3,249,878
SYNCHRONOUS SIGNAL GENERATORS

Jean Pierre Magnin, Sarasota, Fla., assignor to Electro-Mechanical Research, Inc., Sarasota, Fla., a corporation of Connecticut Filed Jan. 16, 1962, Ser. No. 166,538
17 Claims. (Cl. 328—63)

This invention relates to synchronous signal generators and, particularly, to such generators of the type for generating timing signals in synchronism with the bit intervals in a pulse code modulated signal.

Pulse code modulated (PCM) signals are used in various types of communications, telemetering and data processing equipment. Such signals are characterized by the fact that each indication of a data value is represented by a plural-element or a plural-bit pulse group. For the case of an eight-bit code, for example, eight successive bit intervals are required to represent a single data value. Anywhere from none to all of these eight-bit intervals may contain a signal pulse or signal indication depending on the particular data value being represented. The individual pulse groups may be separated by one or more synchronizing pulses. Also, where data values from several different data sources are transmitted in a time multiplexed manner, that is, one after another in sequence, it is common practice to insert a distinguishable synchronizing pulse pattern into the pulse train after each complete cycle of scanning of the data sources.

In order to process or recover the data values represented by the different plural-bit pulse groups, it is frequently necessary to separate these groups and then to detect or determine the pulse pattern present in each individual group. This requires the use of circuits which operate in synchronism with the various elements of the pulse code signal. Such synchronization can be provided by continuously generating timing signals which are synchronous with the basic bit intervals in the pulse code signal and then using these timing signals to control the operation of the circuits which are required to process the pulse code signal.

A major diffculty with generating timing signals in synchronism with the elementary bit intervals is that, while the bit intervals themselves occur in a regular manner, the presence and absence of pulses in the bit intervals is more or less random in nature. In other words, both vacant and occupied bit intervals are interspersed in a more or less random manner. Any synchronizing pulses inserted at regularly spaced intervals in the pulse train are, of course, an exception. If regularly occurring synchronizing pulses are present, then they could be used to synchronize the timing signal generator. Different types of equipment, however, generally utilize different numbers, rates and arrangements of synchronizing pulses. It is desirable, therefore, to provide a universal type of timing signal generator which is not dependent on the existence of any synchronizing pulse patterns in the pulse code signal and which, instead, utilizes the more or less randomly occurring data value pulses to establish the desired synchronization. Such a timing signal generator could then be used with a wide variety of different types of equipment. Also, it could be used with a single piece of equipment which is intended to handle pulse code signals having a wide variety of different pulse groupings and different synchronizing pulse patterns.

It is an object of the invention, therefore, to provide a new and improved synchronous signal generator for generating timing signals in synchronism with the bit intervals in a pulse code signal.

It is another object of the invention to provide a new and improved synchronous signal generator for use with pulse code signals and which is not dependent on the presence of any regularly occurring synchronizing pulses in the pulse code signal.

It is a further object of the invention to provide a new and improved synchronous signal generator which is capable of acquiring synchronism with the bit intervals in a pulse code signal in a minimum of time and, when once acquired, of maintaining this synchronism with a high degree of noise immunity.

It is an additional object of the invention to provide a new and improved synchronous signal generator capable of synchronizing itself with a relatively wide range of bit interval rates.

In accordance with the invention, a synchronous signal generator for generating timing signals in sychronism with the bit intervals in a pulse code signal comprises local oscillator means for generating local timing signals. The synchronous signal generator also includes digital control means responsive to the occurrence of transitions in the pulse code signal which are a bit interval apart for developing and supplying to the local oscillator means a first control signal for controlling the timing of the local timing signals. The synchronous signal generator further includes analog phase control means responsive to individual transitions in the pulse code signal for developing and supplying to the local oscillator means a second control signal for controlling the timing of the local timing signals.

For a better understanding of the present invention, together with other and further objects thereof, reference is had to the following description taken in connection with the accompanying drawings, the scope of the invention being pointed out in the appended claims.

Referring to the drawings.

Figure 1:
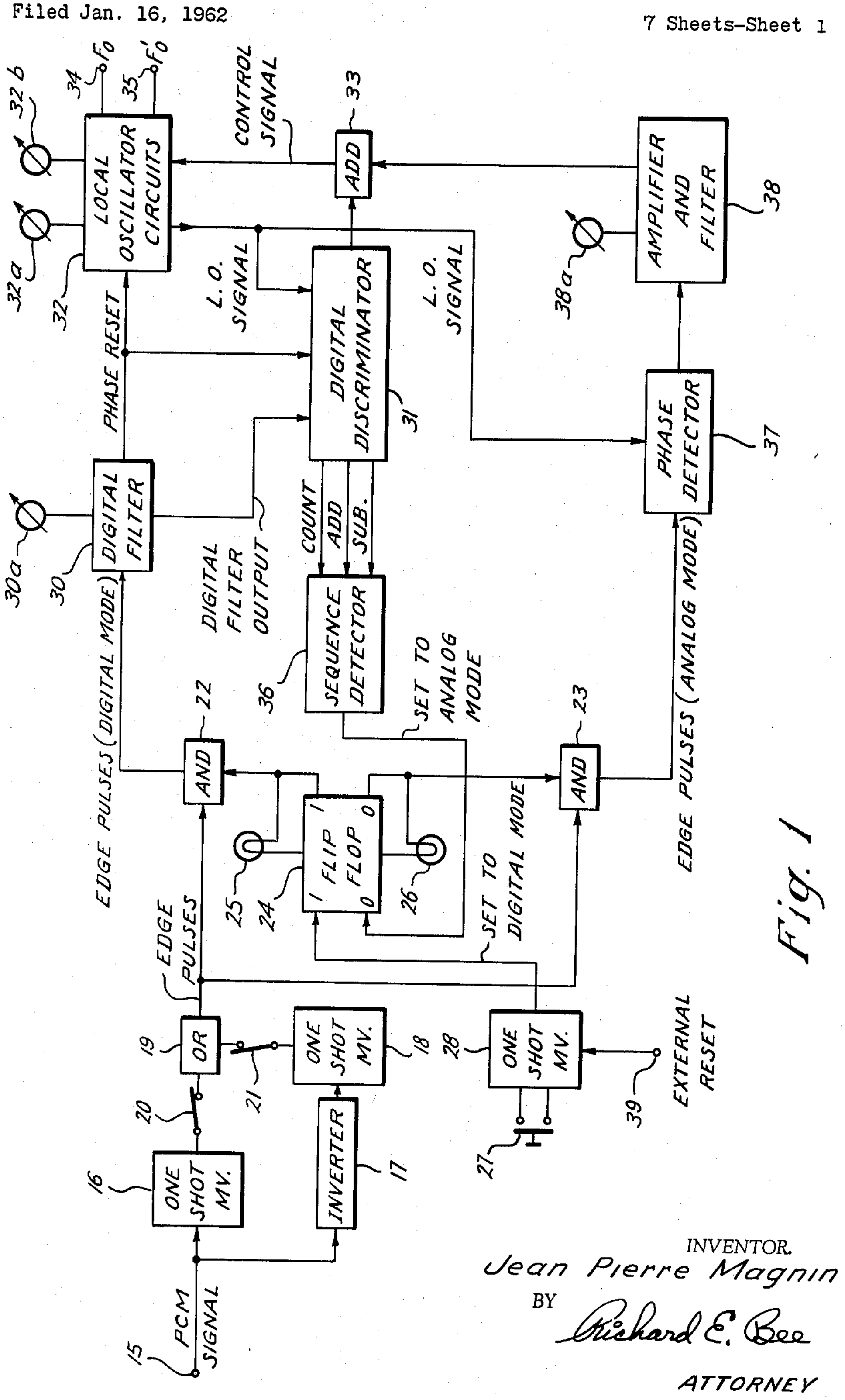
FIG. 1 is a general block diagram of a representative embodiment of a synchronous signal generator constructed in accordance with the present invention.

Referring now to FIG. 1 of the drawings, there is shown a representative embodiment of a synchronous signal generator constructed in accordance with the present invention. This synchronous signal generator serves to develop local timing pulses which are in step with the bit intervals in an incoming pulse code (PCM) signal. More precisely, two sets of timing pulses are generated which differ in phase from one another by a factor of 180°. One of these sets, designated as $F_0$, contains relatively narrow pulses which occur at the border lines or boundaries between adjacent bit intervals. The other set of pulses, designated as $F'_0$, contains relatively narrow pulses which occurs at the midpoints of the bit intervals.

The synchronous signal generator includes a controllable free-running oscillator system for generating these local timing pulses, together with various signal comparison and control circuits for controlling the oscillator system so that these timing pulses are accurately in step, both frequency-wise and phase-wise, with the bit intervals in the incoming pulse code signal. In particular, a novel two-mode type of synchronization is provided. A first of these synchronizing modes is a digital or coarse acquisition mode for pulling the local timing pulse frequency or repetition rate into approximate synchronism with the pulse code bit interval rate as quickly as possible. The second synchronizing mode is an analog mode which comes into operation as soon as approximate synchronization is established by the digital mode and acts to provide a very precise synchronization to within the required degree of accuracy. This analog mode is constructed to have a relatively high degree of noise immunity so that synchronization cannot be very readily upset by any random noise variations in the incoming pulse code signal.

Considering the synchronous signal generator of FIG. 1 in greater detail, such generator includes an input terminal 15 for supplying the pulse code signal with which it is desired to establish synchronism. A typical example of such a pulse code signal is represented by waveform 2*a* of FIG. 2. As there indicated, the pulse code signal, during any given bit interval, can have either of two possible values, one of these values or signal levels representing a binary code value of "one" while the other of these signal levels represents a binary code value of "zero." This particular form of pulse code signal is commonly referred to as a "non-return-to-zero" (NRZ) type since the signal does not return to the zero level when successive bit intervals contain "one" values. Another form of pulse code signal is the so-called "return-to-zero" (RZ) type. In this case, a binary "one" value is represented by the presence of a discrete pulse in the bit interval or, in other words, the "one" level prevails for less than the complete duration of the bit interval. Consequently, the signal will return to the zero level in between pulses in successive bit intervals. A third form of pulse code signal is the so-called "NRZI" type. For this case, any "one" level will exist for a complete bit interval and, hence, the signal has the appearance of the NRZ signal. It differs, however, in that the significant factors are the signal transitions or changes between levels and not the levels themselves. In particular, the occurrence of a level transition, either positive-going or negative-going, means that the following bit interval is to be regarded as having a binary value of "one" regardless of its actual level. In a sense, the transitions themselves are "one"-indicating impulses. The FIG. 1 signal generator will operate with any of these three types of pulse code signals. The NRZ type is used only as an example.

Figure 2:
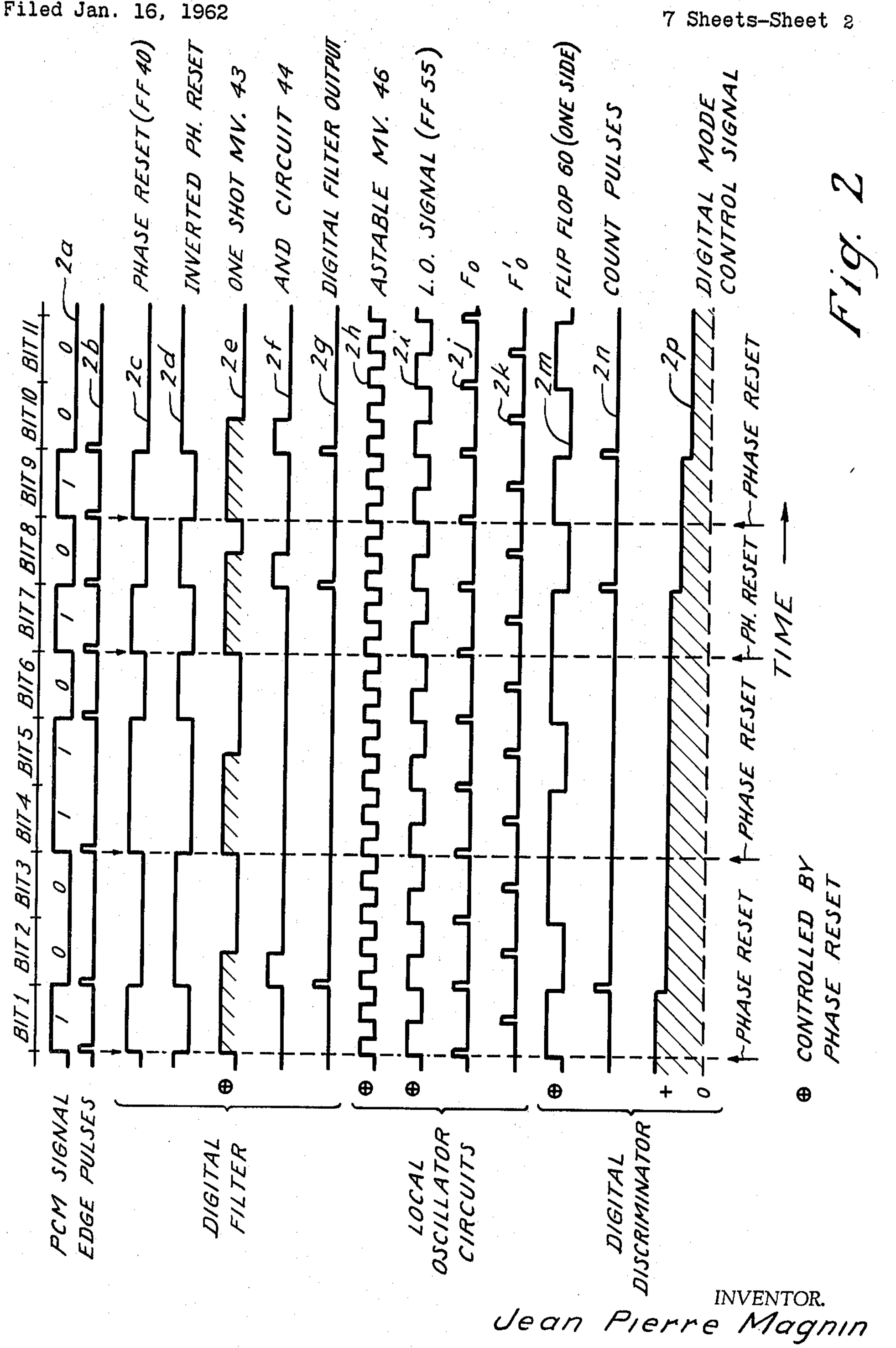
FIG. 2 is a timing diagram for the FIG. 1 signal generator.

The incoming pulse code signal appearing at input terminal 15 is supplied to a one shot multivibrator 16 and an inverter circuit 17. Multivibrator 16 is triggered by each positive-going transition in the pulse code signal to produce a relatively narrow output pulse. The inverter 17 inverts the polarity of the pulse code signal and supplies the inverted signal to a second one shot multivibrator 18. Multivibrator 18 is triggered by each positive-going transition in the inverted signal (negative-going transition in the original signal) to produce a relatively narrow output pulse. The output pulses from multivibrator 16 are supplied to an OR circuit 19 by way of a switch 20. Output pulses from multivibrator 18 are also supplied to OR circuit 19 by way of a second switch 21. For the case of an NRZ pulse code signal both switches 20 and 21 are closed. OR circuit 19 serves to combine these two sets of pulses so that a composite pulse train of the type represented by waveform 2*b* of FIG. 2 is produced. These pulses will be referred to as "edge pulses" since they occur at the edges or boundaries between adjacent bit intervals. An edge pulse will occur at a bit boundary only if there is a level transition in the PCM signal at this same boundary. Consequently, these edge pulses will be present and absent in a more or less random manner.

Switches 20 and 21 will also both be closed for the case of an NRZI type of pulse code signal. For the case of an RZ type signal, however, one will be closed and the other will be open, the one that is closed being determined by the polarity of the leading edges of the "one"-indicating pulses.

The edge pulses appearing at the output of OR circuit 19 are supplied to a pair of AND circuits 22 and 23. These edge pulses are then passed by one or the other, but not both, of the AND circuits 22 and 23. The particular AND circuit which is operative depends on whether the signal generator is operating in the digital mode or in the analog mode. This choice is controlled by a flip-flop circuit 24 which activates the AND circuit 22 when the digital mode is desired and, conversely, activates the AND circuit 23 when the analog mode is desired. An indicator lamp 25 is lit when the digital mode prevails, while an indicator lamp 26 is lit when the analog mode is in operation.

When the signal generator is first turned on, it is necessary to start with the digital mode. This is done by momentarily depressing a push-button switch 27. This triggers a one shot multivibrator 28. The resulting pulse from multivibrator 28 sets flip-flop circuit 24 to the "one" state which, in turn, activates AND circuit 22, thereby to establish the digital mode.

With the AND circuit 22 in an operative condition, edge pulses are passed thereby and are supplied to a digital filter 30. Digital filter 30 is provided with a thirteen-position range selector switch 30*a*. Digital filter 30 is constructed to recognize the occurrence of two edge pulses which are spaced one bit interval apart and to develop an output pulse which coincides with the second of these two edge pulses. This provides a means of recognizing the basic bit interval. Typical ones of these output pulses are represented by waveform 2*g* of FIG. 2. They are supplied to a first input of a digital discriminator 31. Supplied to a second input of the digital discriminator 31 is a local timing signal or local oscillator (L.O.) signal developed by local oscillator circuits 32. Local oscillator circuits 32 are provided with a pair of range selector switches 32*a* and 32*b*. The local oscillator signal supplied to the digital discriminator 31 is represented by waveform 2*i* of FIG. 2. The digital discriminator 31 serves to compare the digital filter output pulses with the local oscillator signal to develop a first control signal which is supplied back to the local oscillator circuits 32 by way of an adding circuit 33. This control signal serves to adjust the operation of the local oscillator circuits 32 so as to bring the frequency of the local oscillator signal into approximate equality with the basic bit interval frequency of the incoming pulse code signal. The two sets of output timing pulses, $F_o$ and $F_o'$ for the FIG. 1 signal generator as a whole appear at output terminals 34 and 35. They are derived from the local oscillator signal by part of the local oscillator circuits 32 and are represented by waveforms 2*j* and 2*k* of FIG. 2.

The degree of synchronization between the local oscillator signal and the digital filter output pulses is monitored by a sequence detector 36. When the desired degree of approximate synchronization is obtained between these two signals, then the sequence detector 36 recognizes this condition and produces an output pulse which is supplied to the mode-control flip flop 24. This pulse serves to switch the flip-flop circuit 24 to the "zero" state and, thereby, to render the AND circuit 23 operative and the AND circuit 22 inoperative. This switches the synchronous signal generator to the analog synchronization mode.

In the analog mode, the edge pulses appearing at the output of OR circuit 19 are supplied by way of the AND circuit 23 to a first input terminal of a phase detector 37. The local oscillator signal from the local oscillator circuits 32 is supplied to a second input terminal of the phase detector 37. Phase detector 37 serves to compare these two input signals to develop an output signal which is dependent on the degree of frequency and phase syncronization existing between such signals. This output signal is then amplified and filtered by amplifier and filter 38. Amplifier and filter 38 is provided with a range selector switch 38*a*. The filter portion of amplifier and filter 38 is of the low-pass type and, together with the frequency selectivity characteristics of the phase detector 37, serves to limit the noise band-width of the analog phase control system. This filter characteristic is constructed to provide the smallest noise bandwidth which is practical for the frequency pull-in range over which the analog phase control system is intended to operate. The output signal from amplifier and filter 38 is applied by way of adding circuit 33 to the local oscillator circuits 32 to adjust the frequency and phase of the local oscillator signal so as to bring it into precise synchronism with the bit intervals in the pulse code signal.

Since adding circuit 33 adds the control signal from the amplifier and filter 38 to the still-prevailing control signal from the digital discriminator 31, the analog phase control loop is only required to provide the additional control action which is necessary to change the local oscillator signal from a state of approximate synchronization to a state of exact synchronization. Because of this reduced pull-in requirement on the analog phase loop, such loop can be constructed to have a higher degree of noise immunity and better synchronization holding properties. In other words, the digital control loop is constructed to provide a relatively wide frequency pull-in range and a relatively fast response characteristic for rapidly pulling the local oscillator signal into approximate synchronization, while the analog phase control loop is constructed to maintain accurate synchronization over a narrower frequency range but with greater immunity to undesired noise fluctuations.

Once the analog mode is reached and enough time has elapsed for the analog control loop to establish accurate synchronization, then this loop will automatically maintain such synchronization so long as the pulse code signal is being supplied to the input terminal 15 of the signal generator. If the pulse code signal should cease for a relatively long period of time or if the signal generator should be shut off, then synchronization will be lost. Synchronization is thereafter re-established by momentarily depressing the push-button switch 27.

Where the present signal generator is used as a part of a larger system which also includes circuits for recognizing the occurrence of periodic synchronizing pulse patterns in the incoming train of pulse code signals, then these circuits can be adapted to generate special reset pulses whenever a predetermined number of such synchronizing pulse patterns have been missed. These special reset pulses, which are generated externally of the present signal generator, can then be applied by way of an input terminal 39 to the one shot multivibrator 28 of the present signal generator. This would serve to automatically reset the present signal generator to the digital mode whenever the incoming pulse code signal is lost.

As indicated by the range selector switches 30*a*, 32*a*, 32*b* and 38*a*, the synchronous signal generator of FIG. 1 is constructed to operate over a relatively wide range of bit interval frequencies. In the present representative embodiment, the synchronous signal generator is constructed to operate with incoming bit interval rates of from 45 cycles per second to 80 kilocycles per second, this overall range being broken down into thirteen steps or bands as provided by the range selector switches. For convenience of operation, these range selector switches 30*a*, 32*a*, 32*b* and 38*a* are ganged together so that they may be controlled by a single control knob.

As an example of a typical use, the synchronous signal generator of FIG. 1 can be used in a telemetering decoder system of the type described in copending application Serial No. 165,100, filed January 9, 1962, in the name of Jean Pierre Magnin. In this case, it would be used as the clock pulse generator of such telemetering decoder system. The output pulses from one or more of the error counting circuits of either the word synchronizer or the frame synchronizer of such decoder system could then be used to provide the external reset which is supplied to the one shot multivibrator 28 of the present signal generator by way of reset terminal 39.

Another type of system which can utilize the present signal generator is the signal converting system described in copending application Serial No. 167,643, filed January 22, 1962, in the name of Jean Pierre Magnin.

Figure 3:
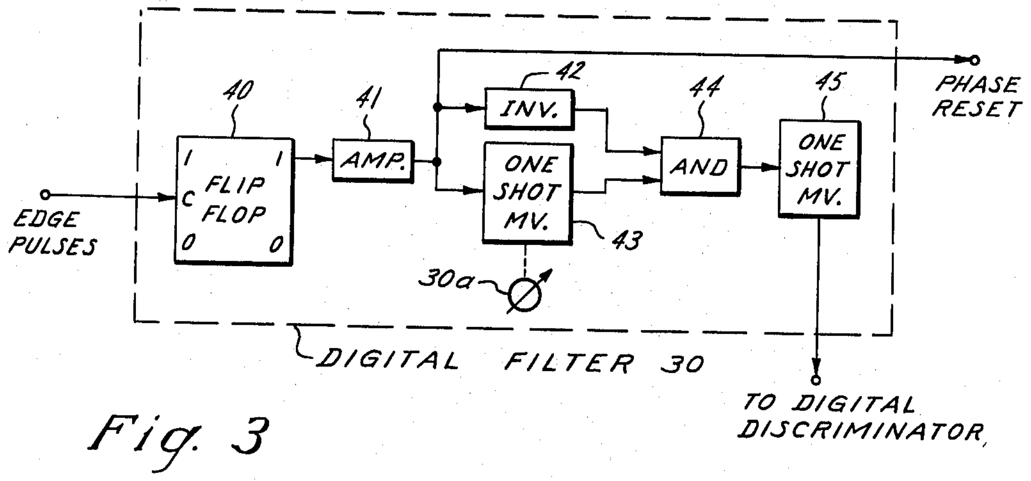
FIG. 3 is a detailed block diagram of a digital filter which is used in the FIG. 1 signal generator.

Referring now to FIG. 3 of the drawings, there is shown a detailed block diagram of the digital filter 30 which is used in the FIG. 1 signal generator. It is assumed that the signal generator is operating in the digital mode and, hence, that edge pulses appearing at the output of OR circuit 19 are being applied to the digital filter 30. As seen in FIG. 3, these edge pulses are applied to a common input of a binary flip-flop circuit 40. These pulses are effective to switch the flip-flop 40 back and forth between its two stable states. The output signal obtained from the "one" side of flip-flop 40 is amplified by an amplifier 41. This amplified signal is represented by waveform 2*c* of FIG 2. The positive-going transitions in this waveform are used as a phase reset signal for both the local oscillator circuits 32 and the digital discriminator 31. In order to provide the filtering action whereby a single output pulse is developed each time two successive edge pulses are spaced apart by the basic bit interval, the amplified flip-flop 40 output signal is applied to both an inverter circuit 42 and a one shot multivibrator 43. The output of each of these circuits is applied to an AND circuit 44. The output of inverter 42 is represented by waveform 2*d*, while the output of multivibrator 43 is represented by waveform 2*e*. The multivibrator 43 is triggered by the positive-going transition in the flip-flop signal appearing at the output of amplifier 41. When it is triggered, it switches over to its unstable state and remains in such state for a fixed length of time determined by its internal time constant, after which it returns to its original stable state. In the unstable state, its output is at a high level which is used to represent a binary value of "one." AND circuit 44 serves to compare the inverter 42 and multivibrator 43 waveforms to produce an output signal or pulse whenever both of these waveforms are simultaneously at the higher of their two possible levels. The output of AND circuit 44 is indicated by waveform 2*f*.

Since the signal transition of flip-flop 40 which turns the multivibrator 43 "on" (unstable state) also drives the inverter 42 output signal to a binary "zero" level (lower of its two levels), both inputs to AND circuit 44 cannot simultaneously be at the binary "one" level (higher level) unless the next edge pulse occurs before the multivibrator 43 returns to its original or stable state. The length of time during which multivibrator 43 remains in its unstable state is chosen so that a second edge pulse will occur while it is in this unstable state only if such second edge pulse occurs not more than one basic bit interval after the first edge pulse. If the second edge pulse should occur two or more basic bit intervals later, then multivibrator 43 will have returned to its original or stable state and no output signal will be produced by the AND circuit 44. The duration of the unstable state of the multivibrator 43 thus determines the effective operating range of the digital filter 30. As such, a given unstable state duration will cover a 2:1 bit rate range with the unstable state time period corresponding to the period of the lowest bit rate within the range. Range selector switch 30*a* is used to adjust the RC time constant of the multivibrator 43 to provide the necessary number of operating ranges which, in the present embodiment, is thirteen in number.

In order to provide relatively narrow output pulses of uniform duration, the positive-going transitions in the output signal from AND circuit 44 are used to trigger a short time constant one-shot multivibrator 45. The output pulses from multivibrator 45 are represented by waveform 2*g* and represent the final output signal from the digital discriminator 30. Thus, one digital filter output pulse is produced upon the occurrence of two successive edge pulses separated by the basic bit interval. The leading edge of this output pulse occurs at the same time as the leading edge of the second of such successive edge pulses.

Figure 4:
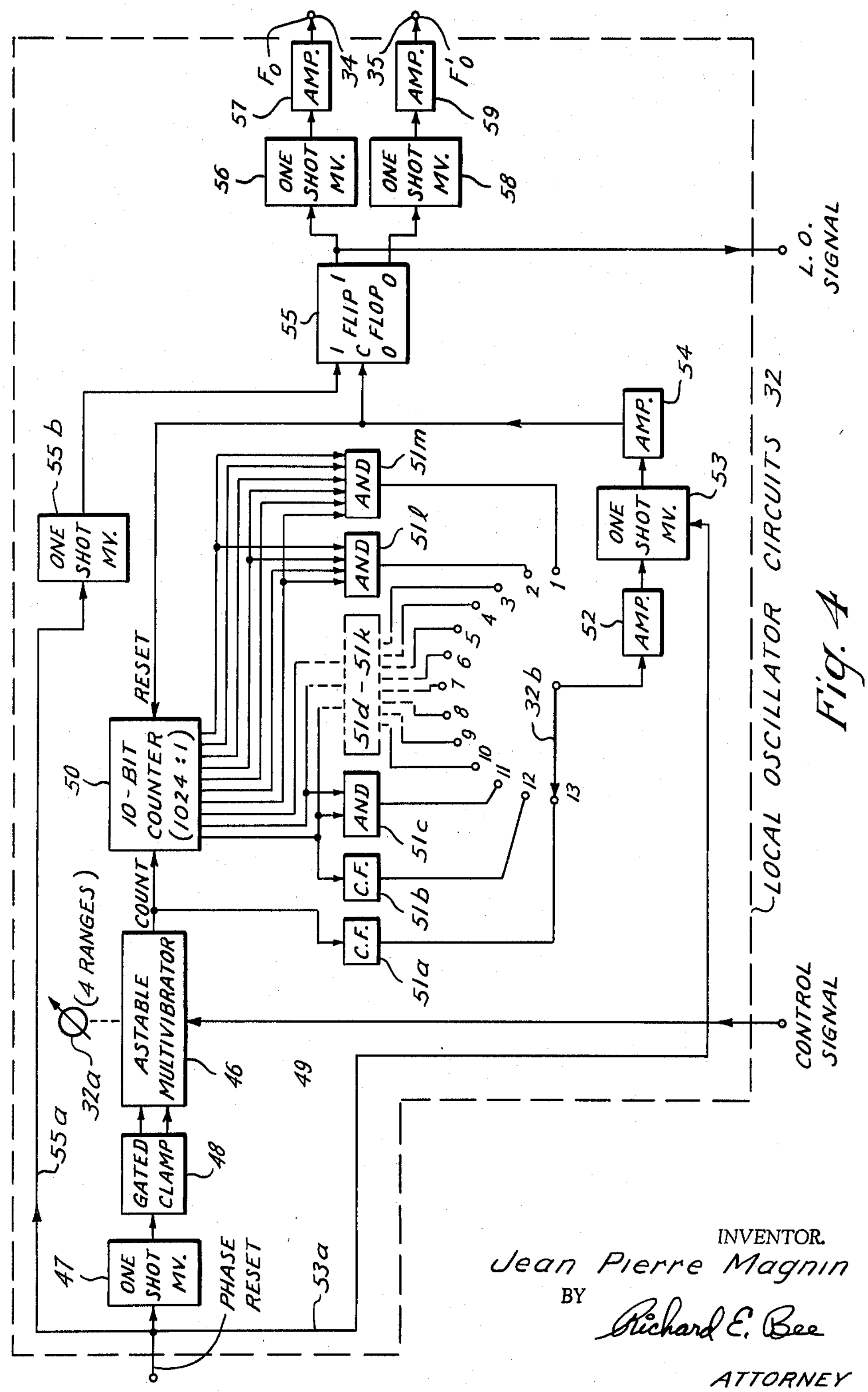
FIG. 4 is a detailed block diagram of local oscillator circuits used in the FIG. 1 signal generator.

Referring now to FIG. 4 of the drawings, there is shown the details of the local oscillator circuit 32. These circuits include a free-running or astable multivibrator 46 which continuously generates an alternating square wave signal as represented by waveform 2*h* of FIG. 2. The phase of this multivibrator signal is periodically synchronized with the incoming edge pulses by means of the phase reset signals represented by the positive-going transitions in the phase reset waveform (waveform 2*c*) developed in the digital filter 30. More particularly, the positive-going transitions in the phase reset waveform serve to trigger a one shot multivibrator 47 which generates corresponding output pulses of relatively short duration. Each of these output pulses momentarily activates a gated clamp circuit 48 which, in turn, clamps one of the control electrodes in the astable multivibrator 46 to a predetermined voltage level. This clamping action sets the astable multivibrator 46 at a predetermined point in its operating cycle. In particular, it sets the astable multivibrator 46 to the point where its output signal first goes to a high level (binary "one" level). Since the positive-going transitions in the phase reset waveform occur for every other edge pulse, positive-going transitions in the astable multivibrator waveform are pulled into phase synchronism with the leading edges of alternate ones of the edge pulses. This phase synchronization will not continue intermediate the positive-going phase reset transitions unless the operating frequency of the astable multivibrator 46 is a predetermined multiple of the occurrence rate of the PCM bit intervals. This operating frequency is determined by the internal time constants of the astable multivibrator 46 together with the value of direct-current bias which is applied to the astable multivibrator 46 by way of a conductor 49. In this respect, the astable multivibrator 46 is a voltage controlled type of oscillator. It is constructed so that its operating frequency may be varied over approximately a 2:1 range by a suitable variation in the bias signal on conductor 49. As seen from FIG. 1, this bias signal or control signal corresponds to the sum of the control signals developed by the digital discriminator 31 and the phase detector 37, except that during the digital mode of operation the output of phase detector 37 assumes a value of zero.

In order that the local oscillator circuits 32 of FIG. 4 may provide local oscillator signals over a fairly wide frequency range (from 45 cycles to 80 kilocycles per second) without at the same time requiring too great a variation in the operating range of astable multivibrator 46, such local oscillator circuits 32 also include an adjustable pulse counter for dividing down the output frequency of the astable multivibrator 46 by selected amounts. This adjustable pulse counter includes a 10-bit (1024:1) counter 50 cathode-follower type (C.F.) circuits 51*a* and 51*b*, AND circuits 51*c*–51*m*, the thirteen-position range selector switch 32*b*, an amplifier 52, a one shot multivibrator 53 and an amplifier 54. 10-bit counter 50 includes ten binary flip-flop stages coupled in cascade. By setting the range selector switch 32*b* at any one of the thirteen different positions, any one of thirteen different counting ratios or frequency dividing ratios may be obtained. These counting ratios together with the corresponding pulse code bit rates and astable multivibrator frequency ranges are indicated by the following table:

TABLE I.—LOCAL OSCILLATOR FREQUENCIES AND COUNTING RATES

| Bit Rate | Counter Switch Position | Astable Multivibrator Range, kc | Counter Ratio | Overall Ratio |
|---|---|---|---|---|
| 45-80 cps | 1 | 86-164 | 1,000:1 | 2,000:1 |
| 80-140 cps | 2 | 92-175 | 600:1 | 1,200:1 |
| 140-250 cps | 3 | 80-153 | 300:1 | 600:1 |
| 250-450 cps | 4 | 96-182 | 200:1 | 400:1 |
| 0.45-0.8 kc | 5 | 86-164 | 100:1 | 200:1 |
| 0.8-1.4 kc | 6 | 92-175 | 60:1 | 120:1 |
| 1.4-2.5 kc | 7 | 80-153 | 30:1 | 60:1 |
| 2.5-4.5 kc | 8 | 96-182 | 20:1 | 40:1 |
| 4.5-8 kc | 9 | 86-164 | 10:1 | 20:1 |
| 8-14 kc | 10 | 92-175 | 6:1 | 12:1 |
| 14-25 kc | 11 | 80-153 | 3:1 | 6:1 |
| 25-45 kc | 12 | 96-182 | 2:1 | 4:1 |
| 45-80 kc | 13 | 86-164 | 1:1 | 2:1 |

The counter switch positions given in Table I are for the range selector switch 32*b*. The astable multivibrator ranges are for the astable multivibrator 46 and are established by the range selector switch 32*a* associated therewith. As is seen from Table I, only four different astable multivibrator ranges are required and these ranges do not differ very greatly from one another.

The 10-bit counter 50 is constructed to count the positive-going transitions in the square wave signal appearing at the output of astable multivibrator 46. Each of circuits 51*a*–51*m* is utilized to develop a positive-going output signal transition after the occurrence of a predetermined number of positive-going transitions in the astable multivibrator square wave. Thus, cathode follower circuit 51*a* produces a positive-going output transition for each positive-going transition in the astable multivibrator waveform to establish a 1:1 counting ratio. Cathode follower circuit 51*b*, on the other hand, is coupled to the output side of the first stage of the counter 50 and produces a positive-going output transition upon the occurrence of every second positive-going transition in the astable multivibrator waveform to establish a 2:1 counting ratio. AND circuit 51*c* is coupled to the output of both the first and second stages of the counter 50 to establish a 3:1 correspondence between the astable multivibrator transitions and its output transitions. In a similar manner, the subsequent AND circuits 51*d*–51*m* are coupled to the appropriate stage of the 10-bit counter 50 to establish the remainder of the counter ratios indicated in Table I. The positive-going transition which is passed by the range selector switch 32*b* is applied by way of the amplifier 52 to the one shot multivibrator 53 to trigger such multivibrator to produce a relatively narrow output pulse. This output pulse is amplified in amplifier 54 and supplied back to the reset terminal of the 10-bit counter 50 so as to reset this counter to a zero count condition. Thus, the 10-bit counter 50 is reset every time the appropriate number of counts is indicated by a positive-going transition at the output of the selected one of circuits 51*a*–51*m*.

The pulses at the output of amplifier 54 are also applied to the common or counting input of a flip-flop circuit 55. Among other things, flip-flop 55 provides a 2:1 dividing action in that two input pulses (positive-going transitions) are required for every positive-going transition in the output of flip-flop 55. Thus, the effective overall counting ratios are as indicated in the last column of Table I. The square wave signal appearing at the "one" side output of the flip-flop 55 is used as the local oscillator (L.O.) signal for the other parts of the FIG. 1 signal generator. This local oscillator signal is represented by waveform 2*i* of FIG. 2 for the case where the range selector switch 32*b* is set at position No. 13 (2:1 overall counting ratio). A comparison with the astable multivibrator waveform (waveform $2h$) shows the 2:1 dividing action of flip-flop 55. The "one" side output of flip-flop 55 is also applied to a one shot multivibrator 56. The positive-going transitions in this "one" side output are used to trigger the one shot multivibrator 56 to produce relatively narrow output pulses which, after amplification by an amplifier 57, are the $F_0$ timing pulses of the signal generator. These $F_0$ pulses are indicated by waveforms $2j$. The "zero" side output of flip-flop 55, on the other hand, is applied to a second one shot multivibrator 58. The positive-going transitions in this "zero" side output, which is an inverted replica of the "one" side output, are used to trigger the one shot multivibrator 58 to produce relatively narrow output pulses. After amplification in an amplifier 59, these pulses constitutes the $F_0'$ timing pulses of the signal generator. These $F_0'$ timing pulses are represented by waveform $2k$.

In order that the positive-going transitions at the "one" side output of flip-flop 55 will correspond to the occurrence of bit edges, the phase reset signal derived from the edge pulses is also applied by way of a conductor 55a to a one-shot multivibrator 55b. The positive-going transitions in this phase reset signal (waveform $2c$) serve to trigger the one shot multivibrator 55b to cause it to produce corresponding output pulses. These output pulses are then supplied to the "one" side input of flip-flop 55 to set this flip-flop 55 to the "one" state. This gives the flip-flop 55 the proper phase sense with respect to the bit edges so that the resulting $F_0$ timing pulses will occur at the bit edges and not during the middle of the bit intervals. The phase reset signal is also supplied by way of a conductor 53a to the one shot multivibrator 53. Consequently, the positive-going phase reset transitions are also effective to recycle the 10-bit counter 50. Thus, the occurrence of a positive-going phase reset transition serves to place each of the astable multivibrator 46, the 10-bit counter 50 and the flip-flop 55 in step with one another in the desired manner.

Figure 5:
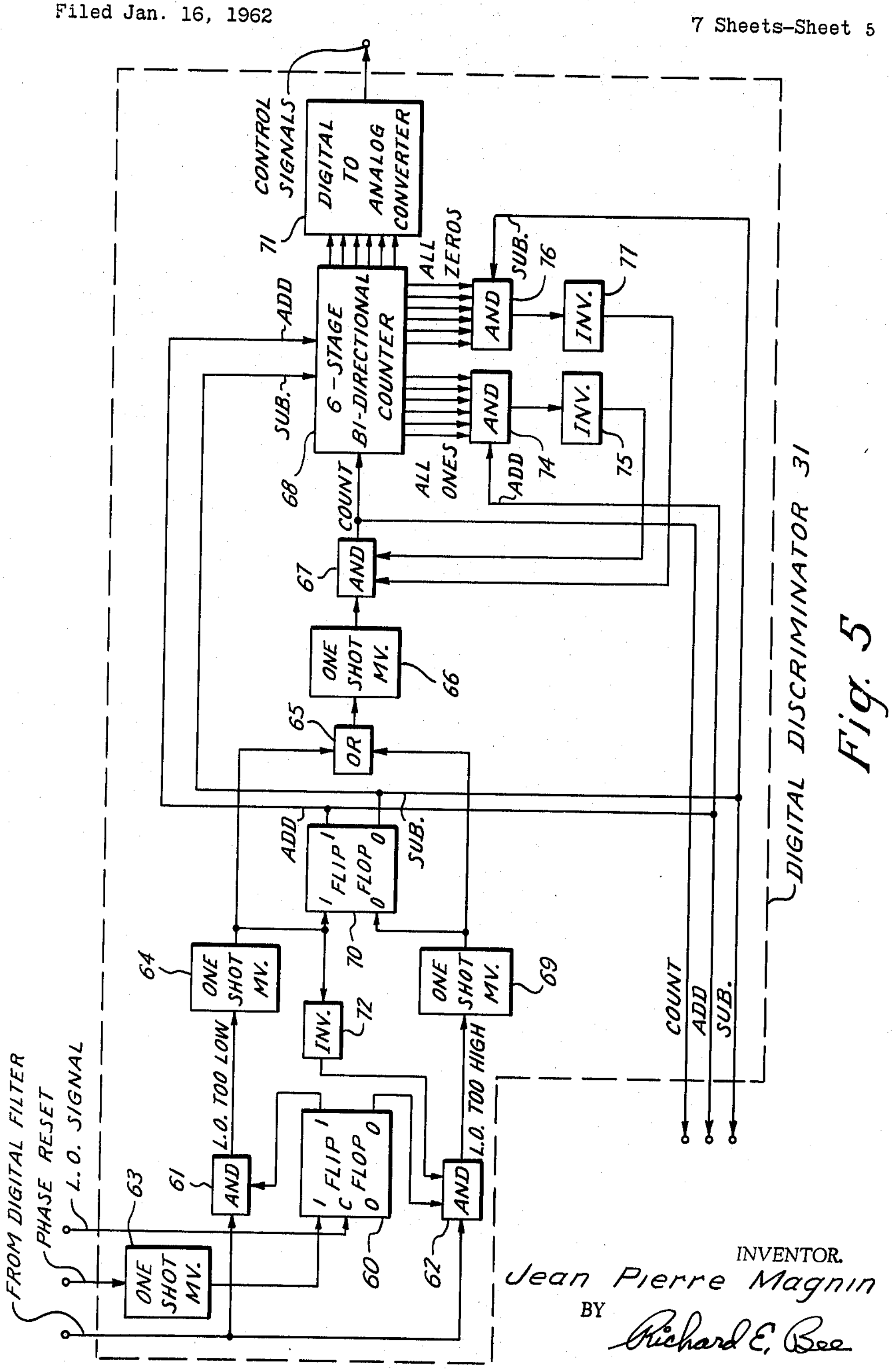
FIG. 5 is a detailed block diagram of a digital discriminator used in the FIG. 1 signal generator.

Referring now to FIG. 5 of the drawings, there is shown the details of the digital discriminator 31. As mentioned, this digital discriminator 31 serves to compare the digital filter output pulses (waveform $2g$) with the local oscillator signal (waveform $2i$) to develop a control signal for adjusting the local oscillator frequency so as to place this frequency in approximate synchronism with the basic bit rate frequency. The signal comparison portion of the digital discriminator 31 comprises a flip-flop circuit 60 which is used to activate either one or the other of AND circuits 61 and 62. This flip-flop circuit 60 is driven by the local oscillator signal which is supplied to the common input thereof. A positive-going transition in the local oscillator signal causes the flip-flop 60 to change from one of its stable states to the other. In order to give these alternations of flip flop 60 the proper phase sense, the phase reset signal (waveform $2c$) produced in the digital filter 30 is also applied to a one shot multivibrator 63 in the digital discriminator 31. A positive-going transition in this phase reset signal serves to trigger the multivibrator 63 to produce an output pulse which sets the flip flop 60 to the "one" state ("one" side output at high level). The resulting signal at the "one" side of flip flop 60 is applied to the AND circuit 61 to activate this circuit whenever such signal is at its higher level. This "one" side output signal is represented by waveform $2m$ of FIG. 2. It is essentially a half-frequency version of the local oscillator signal with the exception that it always starts at the high level immediately following a phase reset transition. The "zero" side output of flip flop 60, on the other hand, is applied to the AND circuit 62. This "zero" side signal is an inverted replica of the "one" side signal. It activates the AND circuit 62 whenever it is at its higher level. Thus, AND circuit 62 is active whenever AND circuit 61 is inactive, and vice versa.

The digital filter output pulses are supplied to the inputs of both AND circuit 61 and AND circuit 62. Each of these digital filter pulses will be passed by one or the other of AND circuits 61 and 62 depending on which one is in an active condition. In this regard, it should be noted that the digital filter pulse will always occur exactly one bit interval after the flip-flop 60 is set to the "one" state by the phase reset transition. Consequently, which of the AND circuits is active will depend on whether the second positive-going transition in the local oscillator signal occurs before or after the occurrence of the digital filter pulse. If the local oscillator frequency is too low, then this local oscillator transition will occur after the digital filter pulse and, consequently, such pulse will be passed by the AND circuit 61, which is still in an active condition due to the phase reset of flip flop 60. If, on the other hand, the local oscillator frequency is too high, then the second local oscillator transition will occur before the occurrence of the digital filter pulse and the digital filter pulse will be passed by the AND circuit 62 which was, in this case, activated at the occurrence of the second local oscillator transition.

Output pulses from AND circuit 61 are transferred by way of a one-shot multivibrator 64, an OR circuit 65, a one-shot multivibrator 66, and an AND circuit 67 to the counting input of a 6-stage bi-directional counter 68. Similarly, output pulses from AND circuit 62 are transferred by way of a one-shot multivibrator 69, the OR circuit 65, the one-shot multivibrator 66 and the AND circuit 67 to the same counting input of the bi-directional counter 68. The pulses at the input of the bi-directional counter 68 are represented by waveform $2n$ of FIG. 2. As is seen by comparison with waveform $2g$, these pulses correspond to the digital filter output pulses. In other words, each digital filter output pulse is counted by the counter 68. Whether a particular count pulse is added or subtracted from the total count in the counter 68 is determined by a flip-flop circuit 70. This flip-flop 70 is set to the "one" state by any pulse which comes from the AND circuit 61. The "one" side output of flip flop 70, in this case, sets the counter 68 to an "add" condition so that the corresponding count pulse will be added to the total count in the counter 68. Any pulse coming by way of the AND circuit 62, on the other hand, serves to set the flip flop 70 to the "zero" state so that the "zero" side output from flip flop 70 will cause the counter 68 to subtract the corresponding count pulse. The total count in the bi-directional counter 68 is converted to a direct-current signal which is proportional thereto by a digital-to-analog converter 71. This direct-current signal is represented by waveform $2p$ and is used to control the frequency of the local oscillator signal developed by the local oscillator circuits 32.

Consider the case where the second positive-going transition in the local oscillator signal occurs during the middle of the digital filter pulse. In this case, AND circuit 61 is activated during the first half of the digital filter pulse, while AND circuit 62 is activated during the last half of the digital filter pulse. Consequently, it is possible that a single digital filter pulse might produce outputs from both of the AND circuits 61 and 62. In order to prevent this from occurring, the output pulse from one shot multivibrator 64 is supplied back by way of an inverter circuit 72 to the AND circuit 62. In the absence of a pulse from multivibrator 64, the output of inverter circuit 72 is of the proper value to enable the AND circuit 62 to be activated whenever the "zero" side output of flip flop 60 is at the high level. In other words, the output of inverter circuit 72 is normally at a high level. The occurrence of a pulse at the output of multivibrator 64, however, drives the output of inverter circuit 72 to the "zero" level and, thus, momentarily disables AND circuit 62. This prevents the passage of any later portion of this same digital filter pulse by AND circuit 62. This, in effect, enables the leading edge of the digital filter pulse to control the phase comparison so that only one of the AND circuits 61 and 62 can produce an output pulse.

The bi-directional counter 68 is also provided with means for preventing it from counting past its maximum count value and, hence, from returning itself to a zero or low count condition. This means includes an AND circuit 74, an inverter circuit 75 and the AND circuit 67 through which the count pulses pass on their way to the input of the counter 68. Normally, the output of AND circuit 74 is at the "zero" level and, consequently, the output of inverter circuit 75 is at the "one" level. As a consequence, this "one" level from the inverter circuit 75 activates the corresponding input terminal of AND circuit 67. When the counter 68 reaches its maximum count condition, then all the inputs to AND circuit 74 which come from the counter 68 are at the "one" level. If the "add" conductor from the flip flop 70 is also at the "one" level, then the output of AND circuit 74 also goes to the "one" level. This drives the output of inverter circuit 75 to the "zero" level which, in turn, disables the AND circuit 67. So long as this condition exists, no further count pulses are supplied to the counter 68. Thus, bi-directional counter 68 sits at its full count value until a count pulse is received which is to be subtracted.

The bi-directional counter 68 also includes means for preventing the subtraction of count pulses down below the zero count condition of such counter. This prevents the bi-directional counter 68 from going past zero back to a high count condition. This means includes an AND circuit 76, an inverter circuit 77 and the AND circuit 67. Normally, the output of AND circuit 76 is at a "zero" level so that the output of inverter 77 is at a "one" level, thus providing activation of the corresponding input terminal of AND circuit 67. If, however, all six stages of the counter 68 are in a "zero" condition, then the corresponding inputs to AND circuit 76 are at a "one" level. If the "subtract" conductor from flip-flop 70 is also at the "one" level, then the output of AND circuit 76 is at the "one" level. This drives the output of inverter circuit 77 to the "zero" level and thus disables AND circuit 67. Consequently, no further count pulses will be supplied to the input of counter 68 so long as these pulses are intended to be subtracted.

If desired, small indicator lamps could be coupled to the outputs of AND circuits 74 and 76 so as to give an appropriate indication whenever the incoming bit rate is beyond the range of the synchronizing circuits of the synchronous signal generator. This would tell the operator to change the settings on the various range selector switches for a different bit rate frequency range.

Figure 6:
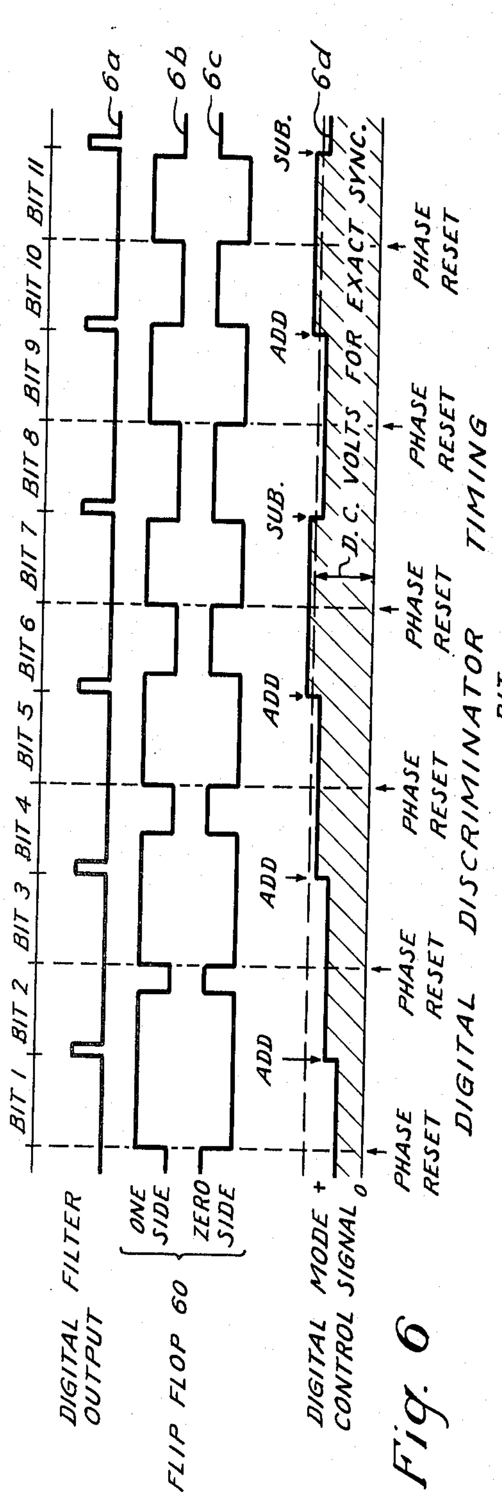
FIG. 6 is a timing diagram for the digital discriminator of FIG. 5.

Summarizing briefly the operation of the digital discriminator 31, the manner in which this discriminator operates to pull the local oscillator signal into approximate frequency synchronism may be better understood with the aid of the waveforms of FIG. 6. FIG. 6 is for the case of a somewhat different composition of pulse code signal than is depicted in FIG. 2. In particular, FIG. 6 corresponds to the case where successive pulse code bit intervals alternate back and forth between the "zero" level and the "one" level. In this case, there is an edge pulse for each boundary between adjacent bit intervals. This means that there will be a phase reset transistion for every other of the bit interval boundaries with a digital filter output pulse occurring at the intermediate boundaries. These digital filter output pulses are represented by waveform *6a* in FIG. 6. For FIG. 6, it is assumed that the frequency of the local oscillator signal is initially too low. The signal at the "one" side output of flip-flop 60 is represented by waveform *6b*, while the inverted signal appearing at the "zero" side of flip-flop 60 is represented by waveform *6c*. The phase reset transition which triggers the one-shot multivibrator 63 causes the flip-flop 60 to start each comparison operation with the "one" side output of the "one" level.

Considering the first comparison interval of FIG. 6, namely, the interval between the first two phase resets, since the local oscillator frequency is too low, the next transition of flip-flop 60 following the first phase reset occurs after the occurrence of the first digital filter pulse. Consequently, this first pulse is passed by AND circuit 61 and added by the counter 68. This increases the output of the digital-to-analog converter 71 by one increment. This converter 71 output signal is represented in FIG. 6 by waveform *6d*. This increase in the converter 71 output signal serves to increase the frequency of the local oscillator signal by a given increment. Consequently, during the second comparison interval (bits 3 and 4), the flip-flop 60 transition following the second phase reset occurs closer to the second digital filter pulse. However, it still occurs after the digital filter pulse. Consequently, the second digital filter pulse is likewise added by the bi-directional counter 68. This further increases the control signal from converter 71 which, in turn, further increases the frequnecy of the local oscillator signal. This process continues until the frequency of the local oscillator signal exceeds the bit interval frequency. When this occurs, as indicated by the comparison interval represented by bits 7 and 8, the flip-flop 60 transition following the phase reset occurs before the corresponding digital filter pulse. Consequently, this pulse is passed by the AND circuit 62 and is subtracted by the bi-directional counter 68. This reduces the converter 71 control signal which, in turn, reduces the local oscillator signal frequency. Consequently, during the next comparison interval (bits 9 and 10), the frequency will be too low and the corresponding digital filter pulse will be added by the bi-directional counter 68. This shifts the local oscillator frequency back to the high side so that the next digital filter pulse will be subtracted.

The occurrence of this alternate adding and subtracting of successive count pulses by the bi-directional counter 68 indicates that the digital control loop has completed its task and has pulled the local oscillator signal into approximate synchronization with the bit interval frequency of the pulse code signal. The direct-current control voltage necessary for exact frequency synchronism lies somewhere in between the higher and lower voltage values which occur during this successive or sustained adding and subtracting alternation. The smaller the local oscillator frequency change for each count of the counter 68, the more accurate will be the approximate frequency synchronization established by the digital loop. On the other hand, the smaller the change, the longer it will take to reach this condition of approximate synchronization for a given initial frequency difference. Also, as indicated in FIG. 2, the composition of the pulse code signal will, more often than not, be such that there will be no edge pulses for many of the bit interval boundaries. Consequently, a greater number of bits will frequently be required to obtain approximate synchronization than is implied in the case of FIG. 6. Regardless of how numerous or infrequent is the occurrence of edge pulse pairs separated by the basic bit interval (this being the requirement to obtain an output pulse from the digital filter 30), the cumulative nature of the digital discriminator 31 insures that approximate frequency synchronization will eventually be obtained and, in fact, will be obtained in the shortest practical time for the prevailing signal conditions and accuracy requirements.

Figure 7:
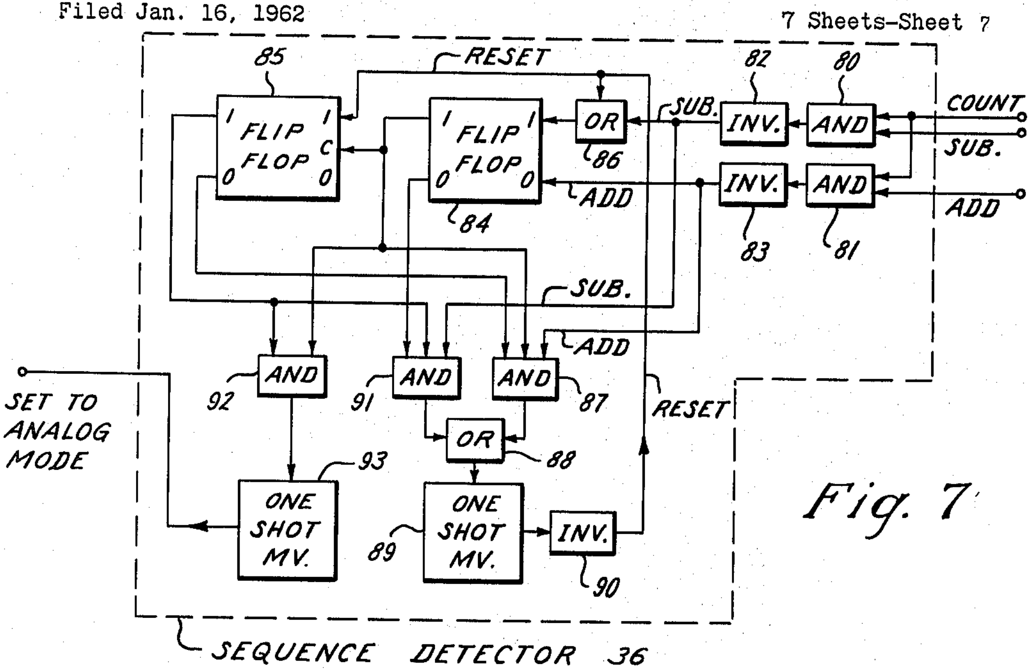
FIG. 7 is a detailed block diagram of a sequence detector used in the FIG. 1 signal generator.
Figure 8:
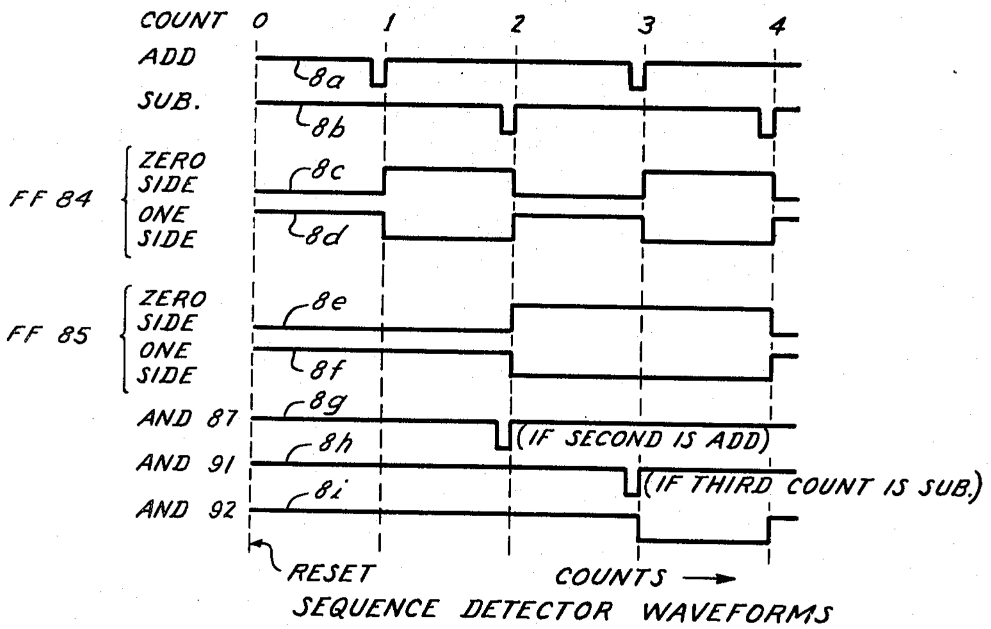
FIG. 8 is a diagram used in explaining the operation of the sequence detector of FIG. 7.

Referring now to FIG. 7 of the drawings, there is shown the details of the sequence detector 36. This sequence detector 36 serves to monitor the state of frequency synchronism in the digital synchronizing loop and to provide an output signal whenever the desired approximate frequency synchronization is obtained. More particularly, the sequence detector 36 is constructed to detect the occurrence of an add-subtract-add sequence in the bi-directional counter 68 (FIG. 5). This counting sequence will occur when the digital loop has pulled the local oscillator frequency as near into synchronism as is possible with such digital loop. In order to detect the add-subtract-add sequence, the count pulses supplied to the input of bi-directional counter 68 together with the "add" and "subtract" control signals appearing at the outputs of flip flop 70 of the digital discriminator 31 (FIG. 5) are also supplied to the sequence detector 36. As shown in FIG. 7, the count pulses are applied to each of a pair of AND circuits 80 and 81. The "subtract" control signal is supplied only to the AND circuit 80, while the "add" control signal is supplied only to the AND circuit 81. This enables the separation of the count pulses which are added by the bi-directional counter into one signal channel, while the count pulses which are subtracted by the bi-directional counter are separated into another and different signal channel. More particularly, the occurrence of a count pulse while the subtract signal is at the "one" level causes this pulse to be passed by AND circuit 80, while the occurrence of a count pulse when the add signal is at the "one" level causes such pulse to be passed by the AND circuit 81. The subtract pulses from AND circuit 80 and the add pulses from AND circuit 81 are inverted by inverter circuits 82 and 83, respectively, to produce corresponding negative-going pulses. These negative-going add and subtract pulses are represented, respectively, by waveforms 8*a* and 8*b* of FIG. 8 for the case of an add-subtract-add-subtract sequence. Note that the abscissa of values in FIG. 8 are not plotted in terms of "time," but rather in terms of the number of count pulses supplied to the sequence detector 36. Timewise, these pulses frequently will not be evenly spaced (see waveform 2*n* of FIG. 2).

These inverted add and subtract pulses are applied to the first of a pair of cascaded flip-flop circuits 84 and 85 which constitute a two-stage binary counter. In particular, the subtract pulses from inverter 82 are supplied by way of an OR circuit 86 to the "one" side input of flip-flop 84, while the add pulses from inverter 83 are supplied to the "zero" side input of flip-flop 84. It is initially assumed that each of the flip-flop circuits 84 and 85 is in the "one" state, that is, their "one" side outputs are high and their "zero" side outputs are low. It is also noted that the "one" side output of the first flip-flop 84 is coupled to the common input of the second flip-flop 85. A positive-going transition at the "one" side output of flip-flop 84 will cause the flip-flop 85 to change from one stable state to another. With these initial conditions, the sequence detector operating cycle starts upon the occurrence of an add pulse at the output of inverter 83. Note that the occurrence of a subtract pulse at the output of inverter 82 would not produce any change because the flip-flop 84 is already in the "one" state. The occurrence of the add pulse, on the other hand, flips the flip-flop 84 to the "zero" state, thus reversing the high and low conditions of the outputs of flip-flop 84 as indicated by waveforms 8*c* and 8*d*. Note also that it is the positive-going trailing edges of the add and subtract pulses which are used for producing the changes in the sequence detector 36.

If the second count pulse is a subtract pulse, then the flip-flop 84 is returned to the "one" state and the resulting positive-going transition at the "one" side output thereof flips the second flip-flop 85 to the "zero" state. This means that the detection of the sought-after add-subtract-add sequence is progressing in the desired manner. If, on the other hand, the second count pulse had been an add pulse, then this negative-going pulse would have been passed by an AND circuit 87. AND circuit 87 is constructed so that the output thereof drops to a "zero" level only when all three inputs thereto are at a "zero" level. This assumed output pulse from AND circuit 87 is represented by waveform 8*g* in FIG. 8. The positive-going trailing edge of this negative-going pulse from AND circuit 87 operates by way of OR circuit 88 to trigger a one shot multivibrator 89. The output of one-shot multivibrator 89 is inverted by an inverter 90 to produce a negative-going reset pulse, the trailing edge of which is used to reset the flip-flop circuits 84 and 85 back to their initial or original "one" states. Thus, if the second count pulse is an undesired add pulse, the sequence detector 36 is recycled and starts all over again to look for the desired add-subtract-add sequence. Assuming that the second count pulse was a desired subtract pulse, then the sequence detector 36 continues on in its operating cycle and waits the occurrence of the third count pulse.

If the third count pulse is a desired add pulse, then the first flip-flop 84 is returned to the "zero" state, the second flip-flop 85 remains in the "zero" state and the sequence detector 36 awaits the arrival of the fourth count pulse. If, on the other hand, the third count pulse had been an undesired subtract pulse, then this negative-going pulse is passed by an AND circuit 91 and the trailing edge thereof is effective to trigger the one-shot multivibrator 89. The pulse which is passed by AND circuit 91 is represented by waveform 8*h*. It is produced because the output of AND circuit 91 drops to the "zero" level whenever all three inputs thereof are at the "zero" level. Triggering of the one-shot multivibrator 89 produces at the output of inverter 90 a negative-going reset pulse which recycles the sequence detector 36 to the original starting condition wherein each of flip-flops 84 and 85 are in the "one" state. This causes the sequence detector 36 to start all over again in its search for the desired add-subtract-add sequence. Assuming, however, that the third count pulse was the desired add pulse, then the sequence detector 36 continues on towards the end of its operating cycle.

After the occurrence of the third count pulse and in the absence of any recycling action, a third AND circuit 92 is activated to produce a "zero" level output. This is because the "one" side outputs of both flip-flops 84 and 85 are now at the "zero" level. This "zero" level output from AND circuit 92 prevails until the occurrence of a subtract pulse, at which time the first flip-flop 84 is returned to the "one" state and the accompanying positive-going transition at the "one" side output thereof returns the second flip-flop 85 to its "one" state. This causes the output of AND circuit 92 to return to its previous "one" level. The output of AND circuit 92 is indicated by waveform 8*i*. The positive-going trailing edge of this waveform serves to trigger a one-shot multivibrator 93. The resulting output pulse from multivibrator 93 constitutes the final output signal from sequence detector 36 and is supplied to the mode control flip-flop 24 of FIG. 1 to switch the synchronous signal generator from the digital synchronizing mode to the analog synchronizing mode.

It should be noted that once the sequence detector 36 reaches the three count position in its operating cycle and a desired add pulse is detected as the third count, then the sequence detector 36 is no longer able to detect any errors in the count pulse sequence. It simply remains in the condition established by the detection of the third correct count until the occurrence of a subsequent subtract pulse, even though there may be one or more intervening add pulses. Such intervening add pulses are ineffective to alter the condition of the flip-flop 84 since this flip-flop 84 is already, at this time, in the "zero" state. It is, of course, apparent that if a correct add-subtract-add sequence has been detected, then it is unlikely that the fourth count will be other than a subtract pulse. It must nevertheless be recognized that the sequence detector 36 only determines the existence of a three-pulse add-subtract-add sequence.

With the mode control flip flop 24 of FIG. 1 set to the "zero" state, the synchronous signal generator is operating in the analog synchronizing mode. Consequently, edge pulses at the output of OR circuit 19 are supplied by way of the AND circuit 23 to a first input of the phase detector 37. AND circuit 22, which controls the input to the digital loop, is now disabled and no further edge pulses are supplied to this loop. Local oscillator circuits 32, however, continue to operate in their previous manner and, in particular, supply the local oscillator signal to a second input of the phase detector 37. This phase detector 37 provides the signal comparison function in the analog loop and, consequently, develops output error signals representative of any lack of synchronism between the edge pulses and the local oscillator signal.

Figure 9:
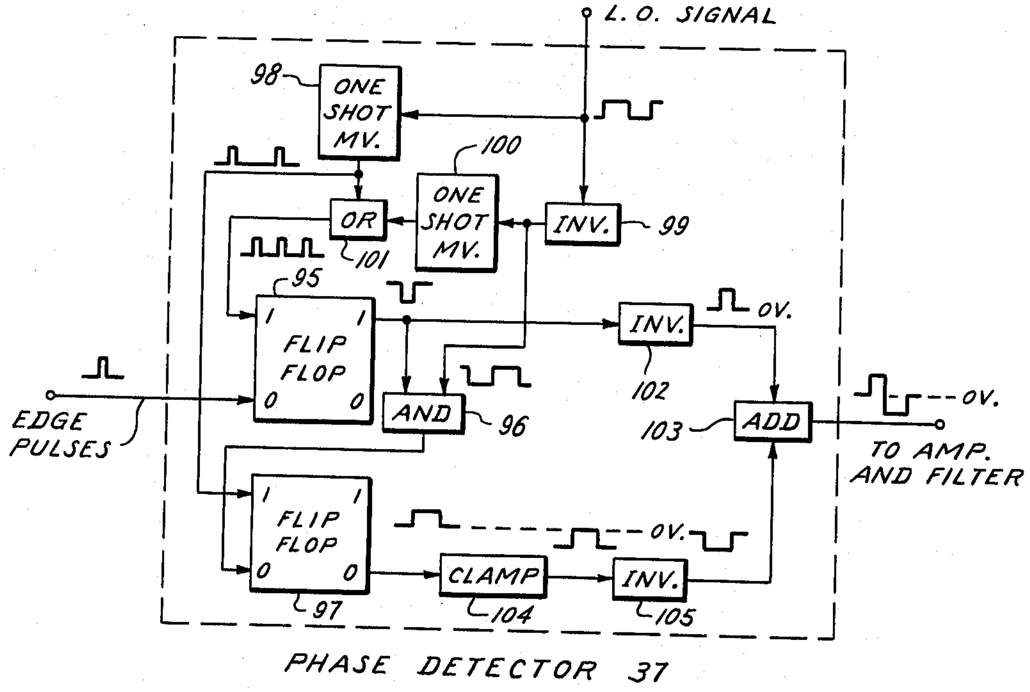
FIG. 9 is a detailed block diagram of a phase detector used in the FIG. 1 signal generator.
Figure 10:
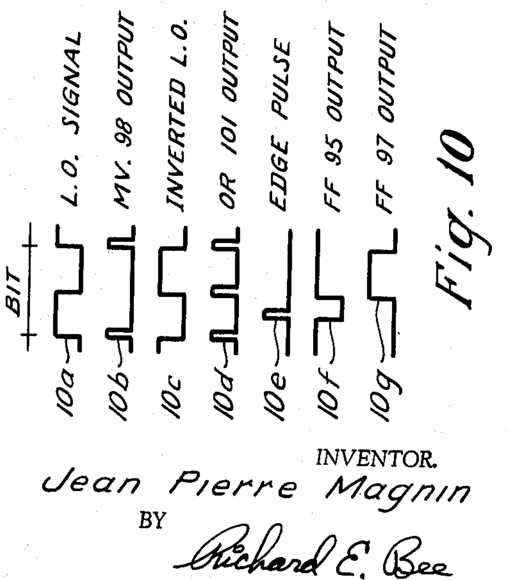

The details of phase detector 37 are shown in FIG. 9. As there seen, the edge pulses are supplied to the "zero" side input of a first flip-flop circuit 95. The "one" side output of this flip-flop 95 is coupled by way of an AND circuit 96 to the "zero" side input of a second flip-flop circuit 97. Flip-flop circuits 95 and 97 serve to generate the positive and negative portions, respectively, of a composite output signal, the negative portion in some cases not being required. The local oscillator signal, on the other hand, is supplied first to a one shot multivibrator 98 and an inverter circuit 99. A one bit segment of this local oscillator signal is represented by waveform 10*a* of FIG. 10. As there indicated, this local oscillator signal is at the "one" level during the first half of its cycle and at the "zero" level during the second half of its cycle. The positive-going transitions in this local oscillator signal are effective to trigger the one-shot multivibrator 98 which, in response thereto, produces relatively narrow output pulses as represented by waveform 10*b*. These pulses are supplied to the "one" side input of the second flip-flop 97 and serve to continually reset this flip-flop 97 to the "one" state. The local oscillator signal is also inverted by the inverter 99 to produce an inverted replica thereof as represented by waveform 10*c*. This inverted signal is supplied to a second input of the AND circuit 96 to activate this AND circuit during the first half of the local oscillator cycle. In this regard, "zero" level inputs are required for the AND circuit 96 in order to obtain a change in its output. The inverted local oscillator signal is also supplied to a one shot multivibrator 100 and the positive-going transitions therein serve to trigger this one shot multivibrator 100. The resulting output pulses from multivibrator 100 are supplied to an OR circuit 101 which also receives the pulses from the multivibrator 98. Consequently, the composite pulse train at the output of OR circuit 101 contains a narrow pulse for each local oscillator transition, regardless of whether it be positive-going or negative-going. This composite pulse train is represented by waveform 10*d*. It is supplied to the "one" side input of flip-flop 95 so as to continually reset this flip-flop to the "one" state.

Figure 11:
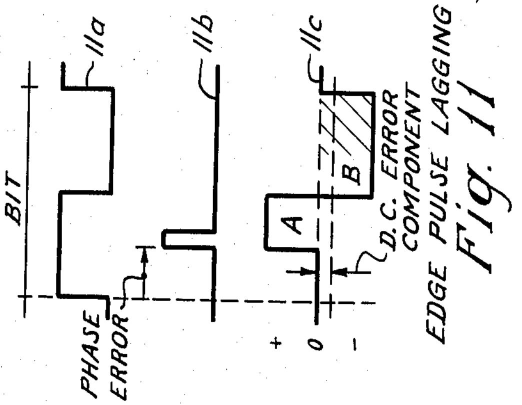

For perfect synchronization, the leading edge of each edge pulse should coincide with a positive-going transition in the local oscillator signal. Where such synchronism does not exist, two cases are possible. In particular, the edge pulse may occur either during the first half or during the second half of the local oscillator signal cycle. Considering first, the case where the edge pulse occurs during the first half ("one" level half) of the local oscillator cycle, this is the case represented in FIG. 10 and also shown on an expanded scale in FIG. 11. The incoming edge pulse (waveform 10*e*) is effective to set the flip-flop circuit 95 to the "zero" state. The next occurring pulse from the OR circuit 101, which occurs at the half way point during the local oscillator cycle, is effective to return the flip-flop 95 to the "one" state. The resulting signal at the "one" side output of flip-flop 95 is a negative-going pulse as represented by waveform 10*f*. The length of this negative-going pulse is determined by how far ahead of the midway point is the occurrence of the edge pulse. This flip-flop 95 pulse is used to form part of the final output from the phase detector 37.

Since the negative-going pulse from the flip-flop 95 (waveform 10*f*) has occurred while the inverted local oscillator signal supplied to AND circuit 96 is at the "zero" level (waveform 10*c*), AND circuit 96 is effective to pass this negative-going pulse. The positive-going trailing edge of this negative-going pulse is effective to set the second flip-flop 97 to the "zero" state. This trailing edge occurs at the midway point during the local oscillator cycle. Flip-flop 97 is then returned to the "one" state by the next reset pulse from multivibrator 98 (waveform 10*b*), which pulse occurs at the end of the local oscillator cycle. The resulting output signal at the "zero" side output of flip-flop 97 is a positive-going pulse having a duration corresponding to the second half of the local oscillator cycle. This signal is represented by waveform 10*g*. As seen by comparison with waveform 10*f*, this positive-going pulse immediately follows the negative-going pulse from flip-flop 95.

In order to produce the composite output signal, the negative-going pulse from the first flip-flop 95 is inverted by an inverter circuit 102 and supplied to a first input of an adding circuit 103. As it appears at the output of inverter 102, the base line of this pulse is at a predetermined reference voltage level such as zero volts. The positive-going pulse from the second flip-flop 97, on the other hand, is first supplied to a clamp circuit 104 which serves to set or clamp the upper level of this pulse to the same reference voltage level. This clamped pulse is then inverted by an inverter circuit 105 and supplied to the second input of the adding circuit 103. As it appears at the output of inverter 105, this pulse is now a negative-going pulse with its base line at the reference voltage level. These two pulses from inverters 102 and 105 are then combined by the adding circuit 103 to produce a composite output pulse which is represented by waveform 11*c* of FIG. 11. It is the direct-current component of this composite pulse which is significant in controlling the local oscillator circuits 32. In this regard, the positive-going portion (area A) serves to cancel or offset an equal area portion (area B) of the negative-going pulse portion so that the direct-current component is determined by the remaining negative-going portion, which portion is shaded or cross-hatched in FIG. 11. Thus, where the edge pulse occurs during the first half of the local oscillator cycle, a negative polarity direct-current component is produced at the output of the adding circuit 103. The closer the edge pulse approaches the middle of the local oscillator cycle, the greater becomes the magnitude of this negative direct current component, this resulting from the diminishing area of the positive-going pulse portion. A maximum negative value is obtained as the leading edge of the edge pulse approaches the midpoint in the local oscillator cycle.

Figure 12:
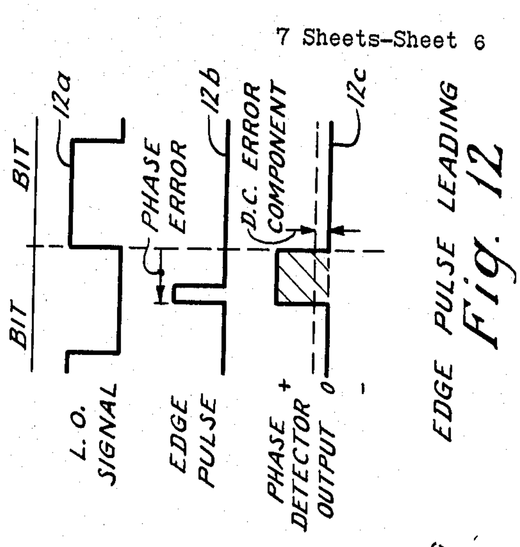
FIGS. 10–12 are timing diagrams used in explaining the operation of the phase detector of FIG. 9.

Considering now the second possible case, where the edge pulse occurs during the second half of the local oscillator cycle, the edge pulse, as before, serves to set the first flip-flop circuit 95 to the "zero" state. It is thereafter returned to the "one" state by the next pulse from the OR circuit 101. This produces a negative-going pulse at the output of flip-flop 95. This time, however, the inverted local oscillator signal supplied to the AND circuit 96 is at the high level and, hence, will not pass this negative-going pulse. Consequently, the second flip-flop 96 remains unchanged and does not produce any output pulse in this situation. Consequently, the output signal from the adding circuit 103 is composed only of the positive-going pulse portion which is obtained by inverting the output from the first flip flop 95. This output from adding circuit 103 is represented by waveform 12*c* of FIG. 12. In this case, the direct-current component is of positive polarity. Its magnitude increases as the edge pulse gets farther away from the start of the local oscillator cycle, with a maximum value being obtained as the leading edge of this edge pulse approaches the half-way point in the local oscillator cycle.

It is seen from the foregoing that when the edge pulse lags behind the positive-going edge of the local oscillator signal, a negative direct-current component is produced and, conversely, when the edge pulse leads the positive-going edge of the local oscillator signal, a positive direct-current component is produced. Consequently, the direct-current component appearing at the output of adding circuit 103 constitutes a suitable error signal for adjusting the frequency and phase of the local oscillator circuits 32. To this end, as seen in FIG. 1, this direct-current component is supplied by way of the amplifier and filter 38 and the adding circuit 33 to the appropriate control terminal of the local oscillator circuits 32. This direct-current signal is then effective to adjust the frequency and phase of the local oscillator signal until complete frequency and phase synchronism with the bit intervals in the incoming pulse code signal is obtained. When such synchronism is obtained, then the leading edges of the edge pulses will coincide with positive-going transitions in the local oscillator signal. In this case, the output of the phase detector 37 will, nominally, go to zero since there is no error. Actually, as is known for this type of phase control loop, a small residual phase error is required so as to produce a small error signal for maintaining the adjustment of the local oscillator frequency. By providing adequate direct-current gain in the analog phase control loop, this residual phase error may be held to a very small value which is within the accuracy requirements of the system.

It is noted that the output of the digital discriminator 31 in the digital loop does not go to zero when the system is in the analog mode. Instead, it retains the value it had just before the system switched to the analog mode. Consequently, in the analog mode, the total control signal supplied to the local oscillator circuits 32 by the adding circuit 33 is the sum of the digital loop signal plus the analog loop signal. In this respect, since the digital loop has already brought the local oscillator circuits 32 into approximate synchronism, the analog loop is only required to supply the additional supplementary control which is necessary to establish substantially exact synchronism. Note also that when the converse situation occurs, namely, when the system is in the digital mode and the analog loop is disabled, then the output of phase detector 37 goes to zero and, hence, the analog loop cannot disturb the operation of the digital loop.

As a result of the foregoing operations of the digital and analog synchronization control loops, the $F_0$ and $F_0'$ timing pulses, which constitute the final output of the synchronous signal generator system of the present embodiment, are accurately in step with the bit interval boundaries and midpoints, respectively, of the bit intervals in the incoming pulse code signal. This synchronism was obtained in spite of the more or less random character of the pulse code signal resulting from the fact that the presence and absence of signal values in the bit intervals occurs in a more or less random manner.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A synchronous signal generator for generating timing signals in synchronism with the bit intervals in a pulse code signal comprising: local oscillator means for generating local timing signals; circuit means responsive to the pulse code signal and to the local timing signals for detecting the occurrence of transitions in the pulse code signal which are a bit interval apart for deriving therefrom and supplying to the local oscillator means a first control signal for controlling the timing of the local timing signals; and circuit means responsive to individual transitions in the pulse code signal and to the local timing signals for developing and supplying to the local oscillator means a second control signal for controlling the timing of the local timing signals.

2. A synchronous signal generator for generating timing signals in synchronism with the bit intervals in a pulse code signal comprising: local oscillator means for generating local timing signals; digital control circuit means responsive to the pulse code signal for detecting the occurrence of transitions in the pulse code signal which are a bit interval apart for deriving therefrom and supplying to the local oscillator means a first control signal for controlling the local oscillator means to establish approximate synchronism between the pulse code bit intervals and the local timing signals; analog control circuit means responsive to individual transitions in the pulse code signal for developing and supplying to the local oscillator means a second control signal for controlling the local oscillator means to establish more precise synchronism between the pulse code bit intervals and the local timing signals; and circuit means for disabling the analog control circuit means until approximate synchronism has been established by the digital control circuit means.

3. A synchronous signal generator for generating timing signals in synchronism with the bit intervals in a pulse code signal comprising: local oscillator means for generating local timing signals; circuit means for detecting the occurrence of interval-indicating transitions in the pulse code signal which are a bit interval apart and comparing these detected transitions with the local timing signals for developing and supplying to the local oscillator means a first control signal for controlling the timing of the local timing signals; and circuit means for comparing any individual interval-indicating transitions in the pulse code signal with the local timing signals for developing and supplying to the local oscillator means a second control signal for controlling the timing of the local timing signals.

4. A synchronous signal generator for generating timing signals in synchronism with the bit intervals in a pulse code signal comprising: local oscillator means for generating local timing signals and including a control portion for controlling the frequency and phase thereof; a digital control loop including means for detecting the occurrence of interval-indicating transitions in the pulse code signal which are a bit interval apart, means for comparing these detected transitions with the local timing signals for developing a first control signal and means for supplying the first control signal to the control portion of the local oscillator means; and an analog phase control loop including means for comparing any individual interval-indicating transitions in the pulse code signal with the local timing signals for developing a second control signal and means for supplying the second control signal to the control portion of the local oscillator means.

5. A synchronous signal generator for generating timing signals in synchronism with the bit intervals in a pulse code signal comprising: local oscillator means for generating local timing signals and including a control portion for controlling the frequency and phase thereof; a digital control loop including means for detecting the occurrence of interval-indicating transitions in the pulse code signal which are a bit interval apart, means for comparing these detected transitions with the local timing signals for developing a first control signal and means for supplying the first control signal to the control portion of the local oscillator means; an analog phase control loop including means for comparing any individual interval-indicating transitions in the pulse code signal with the local timing signals for developing a second control signal and means for supplying the second control signal to the control portion of the local oscillator means; and means for selectively activating the control loops so that the digital loop may be activated until approximate synchronism is obtained whereupon the analog loop may be activated to establish more precise synchronism.

6. A synchronous signal generator for generating timing signals in synchronism with the bit intervals in a pulse code signal comprising: local oscillator means for generating local timing signals; digital filter means responsive to a pair of transitions in the pulse code signal which are a bit interval apart for developing an output signal indication representing the occurrence thereof; and digital discriminator means for comparing this output signal indication with the local timing signals for developing a control signal which is supplied to the local oscillator means for controlling the timing of the local timing signals.

7. A synchronous signal generator for generating timing signals in synchronism with the bit intervals in a pulse code signal comprising: local oscillator means for generating local timing signals; digital filter means responsive to a pair of transitions in the pulse code signal which are a bit interval apart for developing first and second output signal indications respectively representing the occurrence of the first and second of these transitions; circuit means responsive to the first output signal indication for setting the local oscillator means to a predetermined point in its operating cycle; and digital discriminator means for comparing the second output signal indication with the local timing signals for developing a control signal which is supplied to the local oscillator means for controlling the timing of the local timing signals.

8. A wide-range oscillator system comprising: an oscillator circuit; means for varying the oscillator frequency over a predetermined range; a plural-stage counter circuit for counting the oscillator oscillations; a plurality of coincidence circuit means coupled to the counter circuit for detecting the occurrence of different count values therein; selector circuit means for selecting one of the coincidence circuit means and responsive to its output for periodically resetting the counter circuit to an initial count condition; and circuit means coupled to the selector circuit means for providing a periodic output signal which is variable over a much larger frequency range than is provided by the oscillator frequency varying means.

9. A synchronous signal generator for generating timing signals in synchronism with the bit intervals in a pulse code signal comprising:

circuit means for supplying a pulse code signal;

local oscillator means for generating local timing signals;

circuit means responsive to the pulse code signal for detecting the occurrence of signal indications which are spaced a bit interval apart for producing an output signal representative of one of such indications;

circuit means for comparing output signals from the detecting circuit means with local timing signals from the local oscillator means for developing a control signal representative of any difference in timing therebetween;

and circuit means for supplying the control signal to the local oscillator means for adjusting the operation thereof to reduce the difference in timing.

10. A synchronous signal generator for generating timing signals in synchronism with the bit intervals in a pulse code signal comprising:

circuit means for supplying a pulse code signal;

local oscillator means for generating local timing signals;

detecting circuit means responsive to the pulse code signal for determining whether successive transitions in the pulse code signal are a bit interval apart and, if they are, producing an output signal having a predetermined time relationship with respect to such transitions;

circuit means for comparing output signals from the detecting circuit means with local timing signals from the local oscillator means for developing a control signal representative of any difference in timing therebetween;

and circuit means for supplying the control signal to the local oscillator means for adjusting the operation thereof to reduce the difference in timing.

11. A synchronous signal generator for generating timing signals in synchronism with the bit intervals in a pulse code signal comprising:

circuit means for supplying a pulse code signal;

local oscillator means for generating local timing signals;

circuit means responsive to the pulse code signal for selectively reproducing only signal indications which occur within less than two bit intervals after a preceding signal indication;

circuit means for comparing these selectively reproduced signal indications with local timing signals from the local oscillator means for developing a control signal representative of any difference in the timing therebetween;

and circuit means for supplying the control signal to the local oscillator means for adjusting the operation thereof to reduce the difference in timing.

12. A synchronous signal generator for generating timing signals in synchronism with the bit intervals in a pulse code signal comprising:

circuit means for supplying a pulse code signal;

local oscillator means for generating local timing signals;

circuit means responsive to alternate transitions in the pulse code signal for generating a control pulse of predetermined duration, such duration being equal to or greater than one bit interval but less than two bit intervals;

coincidence circuit means responsive to both the pulse code signal and the control pulses for producing an output signal whenever an intervening transition in the pulse code signal occurs during the occurrence of a control pulse;

circuit means for comparing output signals from the coincidence circuit means with local timing signals from the local oscillator means for developing a control signal representative of any difference in timing therebetween;

and circuit means for supplying the control signal to the local oscillator means for adjusting the operation thereof to reduce the difference in timing.

13. A synchronous signal generator for generating timing signals in synchronism with the bit intervals in a pulse code signal comprising:

circuit means for supplying a pulse code signal;

local oscillator means for generating a local timing signal;

circuit means responsive to the pulse code signal for detecting the occurrence of signal indications which are spaced a bit interval apart for producing an output pulse representative of one of such indications;

a bi-directional pulse counter coupled to the detecting circuit means for counting the output pulses produced thereby;

circuit means coupled to the detecting circuit means, the local oscillator means and the bi-directional pulse counter and responsive to the order of occurrence of each output pulse and the nearest transition in the local timing signal for determining the counting direction of the counter for such output pulse;

circuit means coupled to the pulse counter for developing a control signal proportional to the count value contained in the counter;

and circuit means for supplying the control signal to the local oscillator means for adjusting the operation thereof to reduce differences in timing between the pulse code bit intervals and the local timing signal.

14. A synchronous signal generator for generating timing signals in synchronism with the bit intervals in a pulse code signal comprising:

circuit means for supplying a pulse code signal;

local oscillator means for generating a local timing signal;

circuit means responsive to alternate transitions in the pulse code signal for generating a control pulse of predetermined duration, such duration being equal to or greater than one bit interval but less than two bit intervals;

coincidence circuit means responsive to both the pulse code signal and the control pulses for producing an output pulse whenever an intervening transition in the pulse code signal occurs during the occurrence of a control pulse;

a bi-directional pulse counter coupled to the coincidence circuit means for counting the output pulses produced thereby;

circuit means coupled to the coincidence circuit means, the local oscillator means and the bi-directional pulse counter and responsive to the order of occurrence of each output pulse and the nearest transition in the local timing signal for determining the counting direction of the counter for such output pulse;

circuit means coupled to the pulse counter for developing a control signal proportional to the count value contained in the counter;

and circuit means for supplying the control signal to the local oscillator means for adjusting the operation thereof to reduce differences in timing between the pulse code bit intervals and the local timing signal.

15. A synchronous signal generator for generating timing signals in synchronism with the bit intervals in a pulse code signal comprising:

circuit means for supplying a pulse code signal;

local oscillator means for generating local timing signals;

circuit means responsive to the pulse code signal for detecting the occurrence of signal transitions which are spaced a bit interval apart for producing an output signal representative of one of such transitions;

circuit means for comparing output signals from the detecting circuit means with local timing signals from the local oscillator means for developing a first control signal representative of any difference in timing therebetween;

circuit means for supplying the first control signal to the local oscillator means for adjusting the operation thereof to reduce the difference in timing;

circuit means for comparing the pulse code signal with the local timing signals for developing a second control signal representative of any undesired differences in timing between transitions therein;

and circuit means for supplying the second control signal to the local oscillator means for adjusting the operation thereof to further reduce undesired differences in timing between the pulse code bit intervals and the local timing signals.

16. A synchronous signal generator for generating timing signals in synchronism with the bit intervals in a pulse code signal comprising:

circuit means for supplying a pulse code signal;

local oscillator means for generating local timing signals;

circuit means responsive to the pulse code signal for detecting the occurrence of signal transitions which are spaced a bit interval apart for producing an output signal representative of one of such transitions;

first comparing circuit means for comparing output signals from the detecting circuit means with local timing signals from local oscillator means for developing a first control signal representative of any difference in timing therebetween;

circuit means for supplying the first control signal to the local oscillator means for adjusting the operation thereof to reduce the difference in timing;

second comparing circuit means for comparing the pulse code signal with the local timing signals for developing a second control signal representative of any undesired differences in timing between transitions therein;

circuit means for supplying the second control signal to the local oscillator means for adjusting the operation thereof to further reduce undesired differences in timing between the pulse code bit intervals and the local timing signals;

circuit means for selectively activating the detecting circuit means and the second comparing circuit means;

circuit means coupled to the activating circuit means for producing activation of only the detecting circuit means;

and circuit means coupled to the activating circuit means and to the first comparing circuit means for disabling the detecting circuit means and activating the second comparing circuit means when the first comparing circuit means provides an indication that the timing differences therein are less than a predetermined value.

17. A synchronous signal generator for generating timing signals in synchronism with the bit intervals in a pulse code signal comprising:

circuit means for supplying a pulse code signal;

local oscillator means for generating local timing signals;

first comparing circuit means for comparing pairs of transitions in the pulse code signal with the local timing signals for developing a first control signal representative of any timing differences;

second comparing circuit means for comparing individual transitions in the pulse code signal with the local timing signals for developing a second control signal representative of any timing differences;

and circuit means for combining the first and second control signals and supplying the combined signal to the local oscillator means for adjusting the operation thereof to reduce undesired differences in timing between the pulse code bit intervals and the local timing signals.

References Cited by the Examiner

UNITED STATES PATENTS

| | | | |
|---|---|---|---|
| 2,801,336 | 7/1957 | Neeteson | 331—172 |
| 2,970,763 | 2/1961 | Freeman | 328—48 |
| 2,973,507 | 2/1961 | Grondin | 328—94 |
| 3,063,017 | 11/1962 | Lehan et al. | 331—14 |
| 3,072,855 | 1/1963 | Chandler | 328—110 |
| 3,122,647 | 2/1964 | Huey | 328—112 |

ARTHUR GAUSS, *Primary Examiner.*

JOHN KOMINSKI, *Examiner.*

J. MULLINS, J. ZAZWORSKY, *Assistant Examiners.*